(12) United States Patent
Miller et al.

(10) Patent No.: US 8,470,491 B2
(45) Date of Patent: Jun. 25, 2013

(54) PEM FUEL CELL STACK HYDROGEN DISTRIBUTION INSERT

(75) Inventors: Daniel P. Miller, Victor, NY (US); Anthony G. Chinnici, Rochester, NY (US); Steven G. Goebel, Victor, NY (US); Daniel J. Darga, Pleasanton, CA (US); Gary M. Robb, Honeoye Falls, NY (US); Clipson M. Class, Avon, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 516 days.

(21) Appl. No.: 12/720,748

(22) Filed: Mar. 10, 2010

(65) Prior Publication Data

US 2011/0223513 A1    Sep. 15, 2011

(51) Int. Cl.
*H01M 2/38* (2006.01)
(52) U.S. Cl.
USPC ........... 429/459; 429/456; 429/458; 429/512; 429/513
(58) Field of Classification Search
USPC .......................... 429/456, 458, 459, 512, 513
See application file for complete search history.

(56) References Cited

U.S. PATENT DOCUMENTS

| 6,924,056 | B2 | 8/2005 | Whiton et al. | |
|---|---|---|---|---|
| 2005/0118487 | A1 | 6/2005 | Whiton et al. | |
| 2005/0129999 | A1* | 6/2005 | Geschwindt et al. | 429/22 |
| 2006/0147686 | A1* | 7/2006 | Ausen et al. | 428/212 |
| 2006/0280995 | A1 | 12/2006 | Whiton et al. | |
| 2009/0123808 | A1* | 5/2009 | An et al. | 429/34 |

\* cited by examiner

*Primary Examiner* — Milton I Cano
*Assistant Examiner* — Jeremiah Smith
(74) *Attorney, Agent, or Firm* — Fraser Clemens Martin & Miller LLC; J. Douglas Miller (57) ABSTRACT

A fluid distribution insert adapted to be received within an inlet header of a fuel cell assembly. The fluid distribution insert includes a hollow insert with a first end and a second end. An inlet is formed at the first end of the hollow insert in fluid communication with a source of a reactant gas and adapted to receive the reactant gas therein. An outlet is formed intermediate the first end and the second end. The outlet is adapted to deliver the reactant gas to a plurality of fuel cells of the fuel cell assembly, wherein the hollow insert delivers the reactant gas to the fuel cells in a substantially simultaneous and uniform manner.

14 Claims, 8 Drawing Sheets

PEM FUEL CELL STACK HYDROGEN DISTRIBUTION INSERT

FIELD OF THE INVENTION

The present disclosure relates to a fuel cell stack and more particularly to a fuel cell stack including an insert disposed in an inlet header thereof to facilitate a substantially simultaneous and uniform flow of fluid to fuel cells of the fuel cell stack.

BACKGROUND OF THE INVENTION

Fuel cell power systems convert a fuel and an oxidant (reactants) to electricity. One type of fuel cell power system employs a proton exchange membrane (REM) to catalytically facilitate reaction of the fuel (such as hydrogen) and the oxidant (such as air or oxygen) to generate electricity. Water is a byproduct of the electrochemical reaction. The PEM is a solid polymer electrolyte that facilitates transfer of protons from an anode electrode to a cathode electrode in each individual fuel cell of a stack of fuel cells normally deployed in a fuel cell power system.

In the typical fuel cell assembly, the individual fuel cells have fuel cell plates with channels, through which various reactants and cooling fluids flow. Fuel cell plates may be unipolar, for example. A bipolar plate may be formed by combining unipolar plates. The oxidant is supplied to the cathode electrode from a cathode inlet header and the fuel is supplied to the anode electrode from an anode inlet header. Movement of the water byproduct from the channels to an outlet header is typically caused by the flow of the reactants through the fuel cell assembly. Boundary layer shear forces and a pressure of the reactant aid in transporting the water through the channels until the water exits the fuel cell through the outlet header.

A membrane-electrode-assembly (MEA) is disposed between successive plates to facilitate the electrochemical reaction. The MEA includes the anode electrode, the cathode electrode, and an electrolyte membrane disposed therebetween. Porous diffusion media (DM) are positioned on both sides of the MEA to facilitate a delivery of reactants for the electrochemical fuel cell reaction.

When initiating the electrochemical fuel cell reaction in the fuel cell stack, it is typically desired to provide the hydrogen fuel in such a manner to cause the individual fuel cells to receive the hydrogen in the active areas thereof at substantially the same time. However, the inlet header typically fills with hydrogen in such a manner that causes fuel cells closest to a hydrogen inlet of the inlet header to be the first fuel cells to receive the hydrogen and the fuel cells that are farthest from the hydrogen inlet of the inlet header to be the last fuel cells to receive the hydrogen.

As the hydrogen flows into the active areas of the fuel cell plates, a localized voltage rise may be measured. When an electrical load is applied to the fuel cell stack, the voltage rise generates a current that is driven through the remaining fuel cell plates of the fuel cell stack. Fuel cells of the fuel cell stack which do not have a sufficient amount of hydrogen to support the current may experience a localized reversed current, thereby resulting in electrode carbon corrosion. Delaying the start of the electrochemical fuel cell reaction until such time as all the fuel cells are supplied with hydrogen typically results in an undesired emission of hydrogen through the exhaust header of the fuel cell stack.

Various techniques have been employed to simultaneously provide hydrogen to each of the fuel cells at the start-up of the electrochemical fuel cell reaction in the fuel cell stack. One such technique includes providing an inlet header purge valve such as disclosed in U.S. Patent Application Publication No. 2005/0129999. The purge valve enables the inlet header to be flushed with hydrogen just prior to initiating the electrochemical fuel cell reaction. The purge valve increases a cost of the fuel cell system and introduces additional moving parts to the fuel cell system. An alternative technique has employed a plurality of fluid passages to form an external header that supplies the hydrogen to distributed locations within the inlet header of the fuel cell stack. U.S. Pat. No. 6,924,056 and U.S. Patent Application Publication Nos. 2005/0118487 and 2006/0280995 generally illustrate such a technique. The external header may be difficult to seal against the fuel cell stack, and increases a cost and overall size of the fuel cell stack.

It would be desirable to produce a cost effective inlet header insert for a fuel cell stack that facilitates a substantially simultaneous delivery of a hydrogen fuel to each fuel cell in the fuel cell stack at the initiation of an electrochemical fuel cell reaction.

SUMMARY OF THE INVENTION

Compatible and attuned with the present invention, a cost effective inlet header insert for a fuel cell stack that facilitates a substantially simultaneous delivery of a hydrogen fuel to each fuel cell in the fuel cell stack at the initiation of an electrochemical fuel cell reaction, has been surprisingly discovered.

In one embodiment, a fluid distribution insert for a fuel cell assembly comprises a hollow insert with a first end and a second end, the hollow insert adapted to be received within an inlet header of a fuel cell assembly; an inlet formed at the first end of the hollow insert adapted to receive a fluid therein; and an outlet formed intermediate the first end and the second end, the outlet adapted to deliver the fluid to a plurality of fuel cells of the fuel cell assembly, wherein the hollow insert delivers the fluid to the fuel cells at a substantially constant pressure.

In another embodiment, a fluid distribution insert for a fuel cell assembly comprises a hollow insert with a first end and a second end, the hollow insert adapted to be received within an inlet header of a fuel cell assembly; an inlet formed at the first end of the hollow insert adapted to receive a fluid therein; at least one wall section extending outwardly from an outer surface of the hollow insert to form a flow channel thereon; and an outlet formed in the hollow insert within the flow channel, the outlet adapted to provide fluid communication between an interior of the hollow insert and the flow channel, wherein the flow channel delivers the fluid to a plurality of fuel cells of the fuel cell assembly at a substantially constant pressure.

In another embodiment, a fuel cell assembly comprises a first end plate and a spaced apart second end plate; a plurality of fuel cells disposed between the first end plate and the second end plate; an inlet header in fluid communication with the fuel cells for supplying a reactant gas to the fuel cells; a hollow insert with a first end and a second end, the hollow insert adapted to be received within the inlet header of the fuel cell assembly; an inlet formed at the first end of the hollow insert adapted to receive the reactant gas therein; at least one wall section extending outwardly from an outer surface of the hollow insert to form a flow channel thereon; and an outlet formed in the hollow insert within the flow channel, the outlet adapted to provide fluid communication between an interior of the hollow insert and the flow channel, wherein the flow channel delivers the reactant gas to the inlet header of the fuel cell assembly at a substantially constant pressure along a length thereof.

DRAWINGS

The above, as well as other advantages of the present invention will become readily apparent to those skilled in the art from the following detailed description, particularly when considered in the light of the drawings described hereafter.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features.

Figure 1:
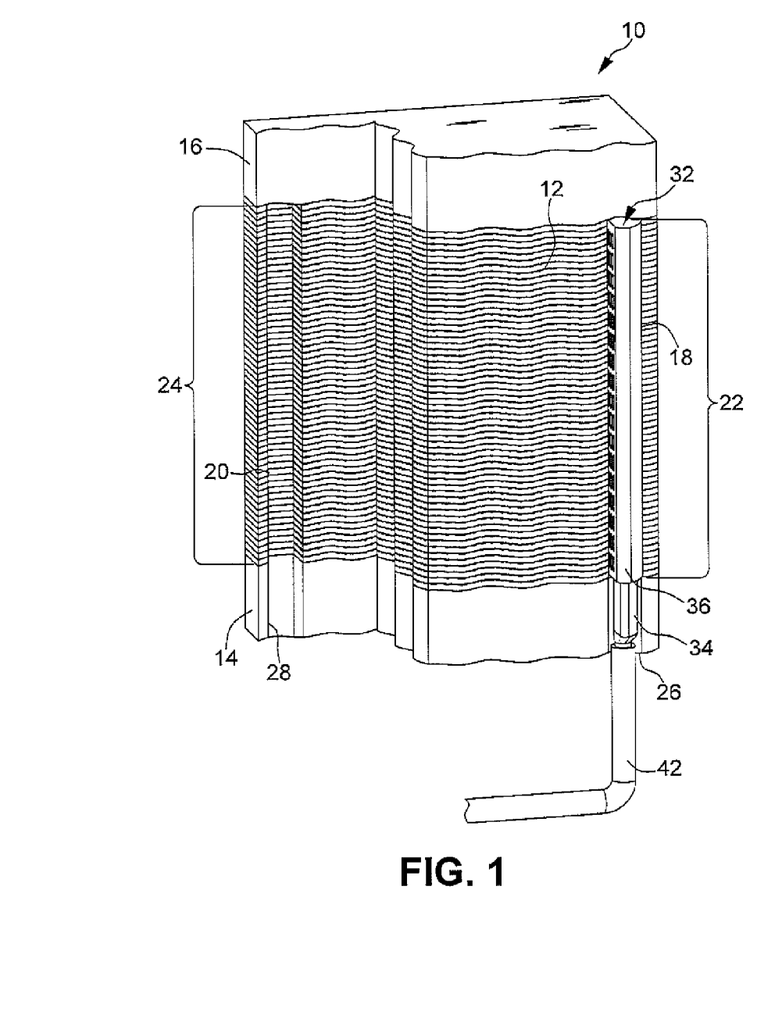
FIG. 1 is a fragmentary perspective view of a fuel cell stack according to an embodiment of the invention showing a distribution insert disposed within an inlet header of the fuel cell.
Figure 2:
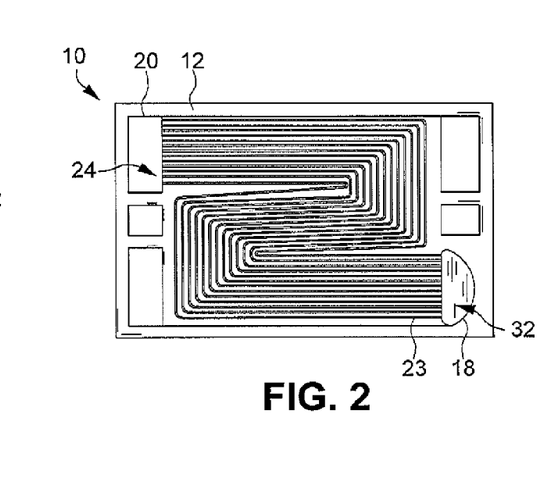
FIG. 2 is a top plan view of the fuel cell stack illustrated in FIG. 1 with an end plate removed.

FIGS. 1-2 show a fuel cell assembly 10 according to an embodiment of the present disclosure. The fuel cell assembly 10 includes a plurality of stacked fuel cells 12 disposed between end plates 14, 16. Each of the fuel cells 12 includes an inlet port 18 and an outlet port 20. The fuel cells 12 are stacked with the inlet port 18 and the outlet port 20 of each fuel cell 12 substantially aligned with the respective inlet port 18 and the outlet port 20 of an adjacent fuel cell 12. Collectively, the inlet ports 18 of each of the fuel cells 12 form an inlet header 22 and the outlet ports 20 of each of the fuel cells 12 form an outlet header 24. The inlet header 22 is adapted to provide a flow of a reactant such as a fuel (e.g. hydrogen) from a source of fuel (not shown) or an oxidant (e.g. air or oxygen) from a source of oxidant (not shown), for example, to a plurality of inlet channels 23 of the fuel cells 12. In the illustrated embodiment, the inlet header 22 is an anode inlet header 22 providing a flow of a fuel to the fuel cells 12.

The end plate 14 includes an inlet 26 formed therein in fluid communication with the inlet header 22 and an outlet 28 formed therein in fluid communication with the outlet header 24. The inlet 26 and the outlet 28 are substantially aligned with the respective inlet header 22 and the outlet header 24. The end plate 16 may include a fluid passage formed therethrough in fluid communication with the inlet header 22. It should be understood that a pressure relief valve, purge valve, and the like, for example, can be provided in the fluid passage to selectively allow a flow of a fluid therethrough.

Figure 3:
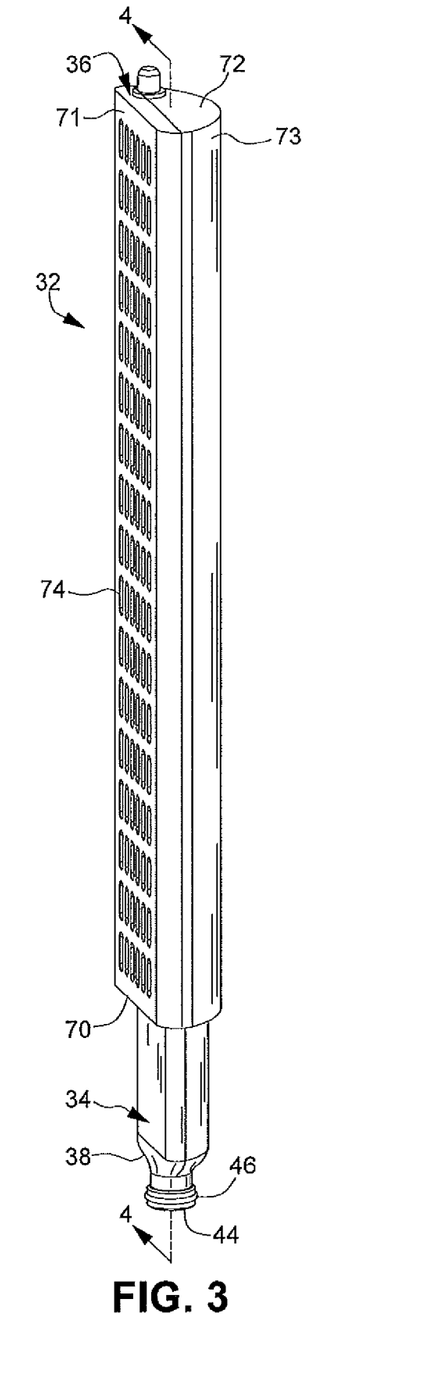
FIG. 3 is an enlarged front perspective view of the distribution insert illustrated in FIG. 1.
Figure 4:
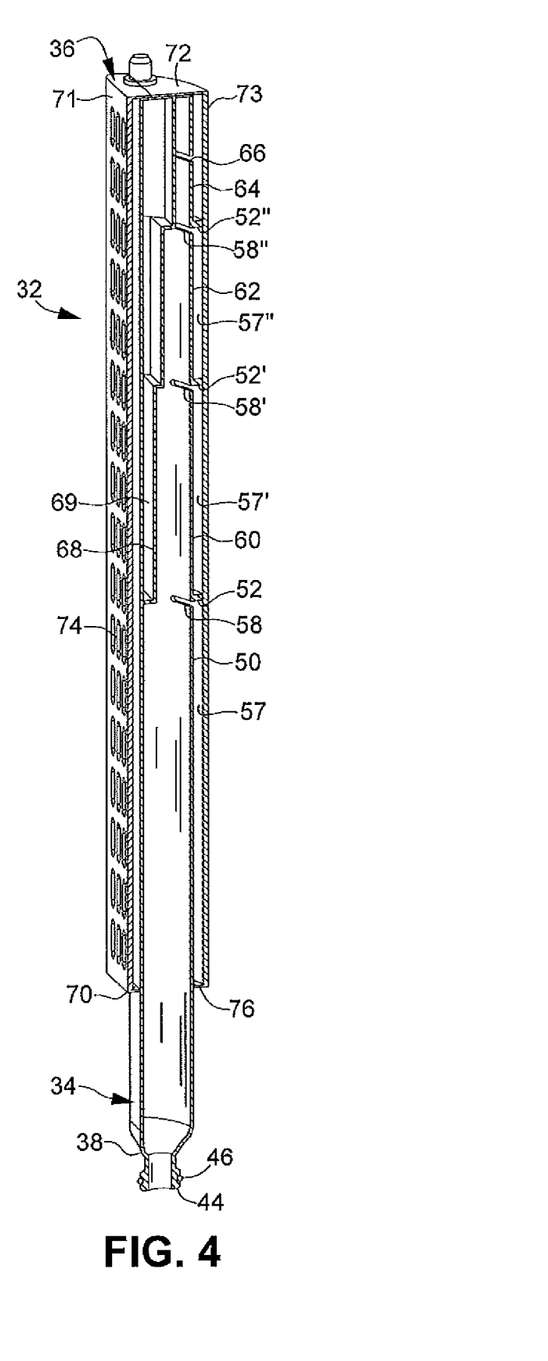
FIG. 4 is an enlarged cross-sectional front perspective view of the distribution insert illustrated in FIG. 1 taken along line 4-4 of FIG. 3.
Figure 5:
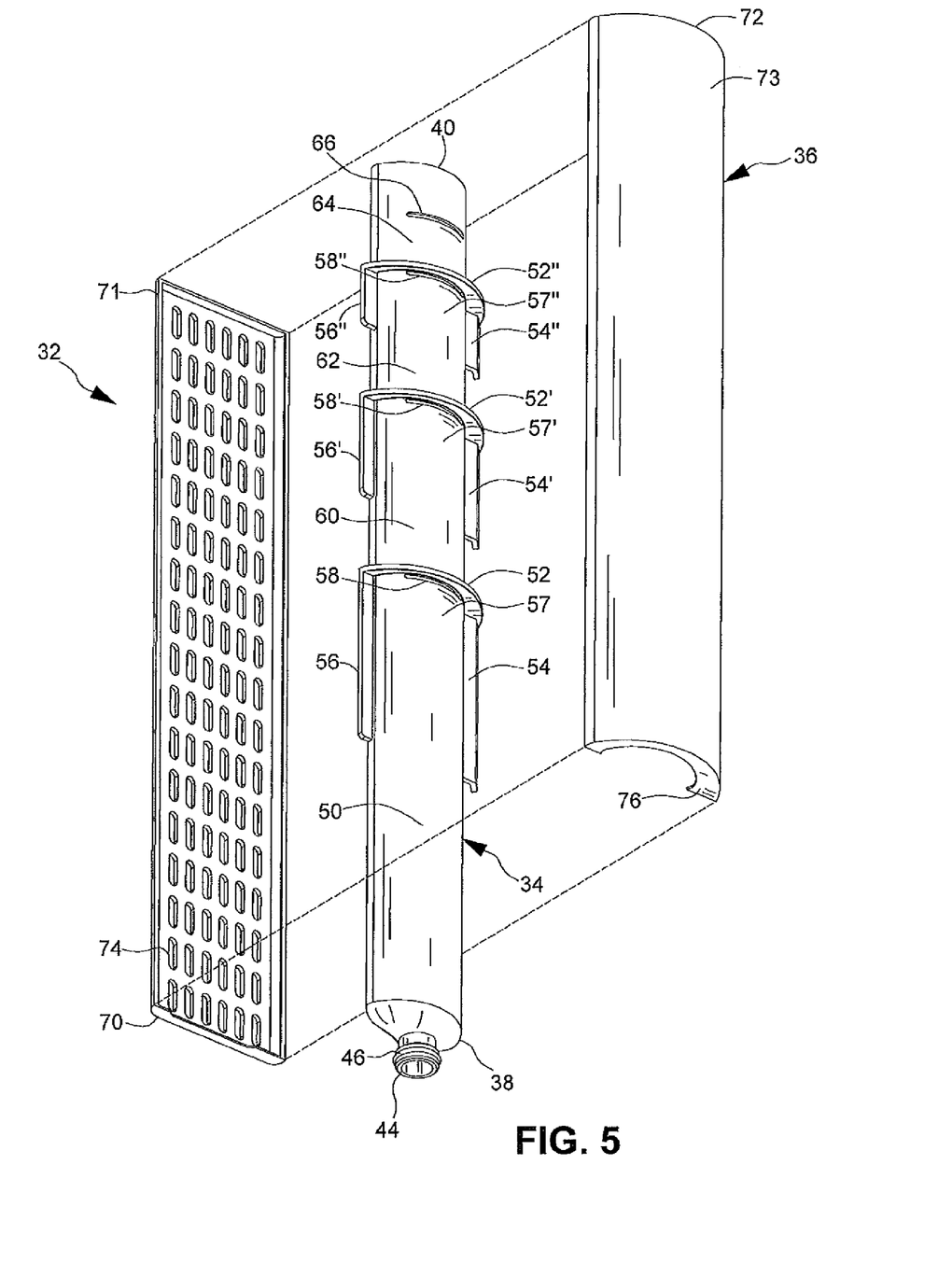
FIG. 5 is an enlarged exploded bottom rear perspective view of the distribution insert illustrated in FIG. 1.

A fluid distribution insert 32, more clearly shown in FIGS. 3-5, is disposed within the inlet header 22. As shown, the distribution insert 32 extends from the inlet 26 of the end plate 14 to the end plate 16. The distribution insert 32 is a generally hollow elongate insert having an inner tube 34 and an outer tube 36. The inner tube 34 includes a first end 38 and a second end 40, wherein the first end 38 is disposed adjacent the inlet 26 of the end plate 14 and the second end 40 is disposed adjacent the end plate 16. A supply conduit 42 provides fluid communication from the source of the fuel to an inlet at the first end 38 of the inner tube 34. The inner tube 34 is adapted to provide a fluid flow path from the supply conduit 42 through an interior of the distribution insert 32.

A coupling member 44 is formed at the first end 38 of the inner tube 34 adapted to facilitate coupling the inner tube 34 to the supply conduit 42. A first sealing member 46 such as an O-ring, for example, can be provided to facilitate forming a substantially fluid tight seal between the first coupling member 44 and the supply conduit 42. It should be understood that other coupling members such as a threaded coupling, a snap-fit coupling, and the like, for example, can be provided to facilitate coupling the inner tube 34 to the supply conduit 42.

The inner tube 34 is divided into a plurality of sections along a longitudinal axis thereof. In the illustrated embodiment, the inner tube 34 is divided into four sections. It should be understood that the inner tube 34 may be divided into fewer or more sections. A first section 50 extends from the first end 38 to a point intermediate the first end 38 and the second end 40. A lip 52 extends laterally outwardly from an outer surface of the inner tube 34 and defines an end of the first section 50. In the illustrated embodiment, a length of the first section 50 is about half the length of the inner tube 34. It should be understood that other lengths of the first section 50 can be provided. Wall sections 54, 56 are formed on the outer surface of the inner tube 34. The wall sections 54, 56 extend from opposing ends of the lip 52 substantially parallel to a longitudinal axis of the inner tube 34 toward the first end 38 thereof. In the illustrated embodiment, a length of the wall sections 54, 56 is about half a length of the first section 50. It should be understood that other lengths can be employed for the wall sections 54, 56. The lip 52 and the wall sections 54, 56 form a flow channel 57 on the outer surface of the inner tube 34. An outlet 58 is formed in the inner tube 34 adjacent the lip 52 between the first end 38 and the lip 52. A second section 60 and a third section 62 are provided which have substantially the same structure as the first section 50. Like structure repeated for the second section 60 and the third section 62 include the same reference numeral and one prime (') symbol and two prime (") symbols, respectively. A length of the respective sections 60, 62 is defined by a distance between successive lips 52, 52', 52". A length of the second section 60 is shorter than a length of the first section 50, and a length of the third section 62 is shorter than the length of the second section 60. In the illustrated embodiment, the length of the second section 60 is about half the length from the lip 52 to the second end 40, and the length of the third section 62 is about half the length from the lip 52' to the second end 40. It should be understood that other lengths of the second section 60 and the third section 62 can be provided. A fourth section 64 (or the last section of the inner tube 34) extends from the lip 52" defining the end of the third section 62 to the second end 40 of the inner tube 34. An outlet 66 is formed in the inner tube 34 at about a mid-point of the fourth section 64, wherein the outlet 66 is in substantial longitudinal alignment with the outlets 58, 58', 58".

An interior of the inner tube 34 is shown in FIG. 4. The interior of the inner tube 34 includes a wall 68 forming a compartment 69 within the inner tube 34. The compartment 69 is formed to reduce a cross-sectional area of the flow path along the longitudinal axis of the inner tube 34, wherein a cross-sectional area of the flow path is at a maximum in the first section 50 of the inner tube 34 and at a minimum in the fourth section 64 of the inner tube 34.

The inner tube 34 of the distribution insert 32 may be formed as a single piece by injection molding a plastic material, for example. It should be understood that the inner tube 34 can be formed employing other processes and materials. It should also be understood that the inner tube 34 may be formed as separate pieces which are coupled together to form the inner tube 34. For example, each section 50, 60, 62, 64 may be formed individually and then coupled together in substantially longitudinal alignment employing an adhesive, a weld, and a snap fit, for example. Additionally, the inner tube 34 of the distribution insert 32 may be formed from a wicking material adapted to collect water entrained in the fuel. It should be understood that the wicking material can be a hydrophilic material, a hydrophobic material, and any other suitable material adapted to collect water entrained in the reactant.

The outer tube 36 includes a first section 71 and a second section 73 joined together to surround at least a portion of the inner tube 34. The outer tube 36 includes an open end 70 and a closed end 72, wherein the second end 40 of the inner tube 34 is adjacent the closed end 72 of the outer tube 36. The first section 71 of the outer tube 36 includes a plurality of apertures 74 formed therein. The outer tube 36 is oriented in respect of the inner tube 34 to position the apertures 74 opposite the side of the inner tube 34 having the lips 52, 52', 52" and the outlets 58, 58', 58", 66. A lip 76 extending laterally outwardly from an inner surface of the outer tube 36 is formed adjacent the open end 70 thereof, wherein the lip 76 is adapted to abut the outer surface of the inner tube 34 to form a substantially fluid tight seal therebetween. It should be understood a sealing member (not shown) can be disposed between the lip 76 and the outer surface of the inner tube 34 to facilitate forming the substantially fluid tight seal. It should be understood that a lip extending outwardly from an outer surface of the inner tube 34 can be formed adjacent the first end 38 thereof, wherein the lip is adapted to abut a surface of the outer tube 36 to form a substantially fluid tight seal therebetween. The lip 72 together with the lips 52, 52', 52" and the wall sections 54, 54' 54", 56, 56', 56" cooperate to position an inner surface of the outer tube 36 spaced apart from an outer surface of the inner tube 34, wherein a fluid can flow from the flow path within the inner tube 34, through the outlets 58, 58', 58", 66 and the flow channels 57, 57', 57", around the outer surface of the inner tube 34 to the front of the inner tube 34, and through the apertures 74 of the outer tube 36. It should be understood that the outer tube 36 can be eliminated from the distribution insert 32, wherein the lips 52, 52', 52" and the wall sections 54, 54' 54", 56, 56', 56" cooperate to position an outer surface of the inner tube 34 spaced apart from an inner surface of the inlet header 22 and the fluid flows between the outer surface of the inner tube 34 and the inner surface of the inlet header 22.

The outer tube 36 of the distribution insert 32 may be formed by injection molding a plastic material, for example, wherein the first member 71 and the second member 73 are formed individually and then coupled together to surround at least a portion of the inner tube 34 employing an adhesive, a weld, and a snap fit, for example. It should be understood that the inner tube 34 can be formed employing other processes and materials. It should also be understood that the outer tube can be formed as a unitary structure. Additionally, the outer tube 36 of the distribution insert 32 may be formed from a wicking material adapted to collect water entrained in the fuel. It should be understood that the wicking material can be a hydrophilic material, a hydrophobic material, and any other suitable material adapted to collect water entrained in the reactant.

It should be understood that the cross-sectional shape of the distribution insert 32 can be substantially circular, oval, triangular, square, rectangular, or a combination of curved and substantially planar surfaces, for example, wherein the cross-sectional shape of the distribution insert 32 is adapted to be received within the inlet header 22 of the fuel cell assembly 10.

In use, the distribution insert 32 is inserted within the inlet header 22 to position the closed end 72 of the outer tube 34 adjacent the end plate 16. It should be understood that the end plate 16 or the outer tube 34 can include a member adapted to couple the distribution insert 32 to the end plate 16. The coupling member 44 is caused to sealingly engage the supply conduit 42 to provide a flow of fuel from a source through the supply conduit 42 and into the inner tube 34 of the distribution insert 32. The coupling member 44 facilitates securing the distribution insert 32 within the inlet header 22. The distribution insert 32 is oriented in respect of the inlet header 22 to position the apertures 74 formed in the first section 71 of the outer tube 36 adjacent the inlet channels 23 of the fuel cells 12. Further, the distribution insert 32 is oriented in respect of the inlet header 22, wherein the outlets 58, 58', 58", 66 formed in the inner tube 34 face an inner surface of the inlet header 22 that is substantially opposite the inlet channels 23 of the fuel cells 12.

Fuel flows into and through the inner tube 34, wherein a portion of the fuel flows through the outlets 58, 58', 58" formed in each of the respective sections 50, 60, 62. The fuel is received in the flow channels 57, 57', 57" between the outer surface of the inner tube 34 and the inner surface of the outer tube 36. The flow channels 57, 57', 57" of each of the sections 50, 60, 62 direct the fuel toward the first end 38 of the inner tube 34 to about the midpoint of the respective sections 50, 60, 62. As the fuel flows past the ends of the wall sections 54, 54' 54", 56, 56', 56", the fuel flows around the outer surface of the inner tube 34 toward the front of the distribution insert 32 and the apertures 74 formed in the first section 71 of the outer tube 36. A portion of the fuel also flows through the outlet 66 formed in the inner tube 34 in the fourth section 64. The fuel flows through the outlet 66 and around the outer surface of the inner tube 34 toward the front of the distribution insert 32 and the apertures 74 formed in the first section 71 of the outer tube 36. The fuel flows through the apertures 74 into the inlet header 22 adjacent the inlet channels 23 of the fuel cells 12.

As fuel flows through the outlet 58 in the first section 50, the volume of the fuel within the flow path formed in the inner tube 34 is reduced. The reduced volume of fuel would normally cause an increase in a static fluid pressure and a reduction in a velocity of the fuel flowing through the remaining sections 60, 62, 64 of the inner tube 34. However, the compartment 69 in the interior of the inner tube 34 causes a volume of the flow path to be reduced in each of the subsequent sections 60, 62, 64. The reduced volume of the flow path in each subsequent section 60, 62, 64 facilitates maintaining a selected fluid pressure and velocity of the fuel through the entire length of the inner tube 34 as the volume of the fuel is reduced due to the fuel flowing through outlets 58, 58', 58". Further, introducing the fuel to the front of the distribution insert 32 adjacent the mid-point of each of the sections 50, 60, 62, 64 minimizes differences between lengths of the fluid flow path from the supply conduit 42 to the points where the fuel exits the distribution insert 32 and is introduced to the inlet header 22 adjacent the inlet channels 23 of the fuel cells 12.

By maintaining a selected fluid pressure and velocity of the fuel along the entire length of the inner tube 34, and by introducing the fuel into the inlet header 22 at four locations along the length thereof, a time difference between the introduction of the fuel to the fuel cells 12 is minimized. Further, by minimizing a time difference between the introduction of the fuel to the fuel cells 12, localized reversed current in the fuel cells 12 and an associated electrode carbon corrosion is minimized, and an undesired emission of hydrogen through the exhaust header is minimized.

Figure 6:
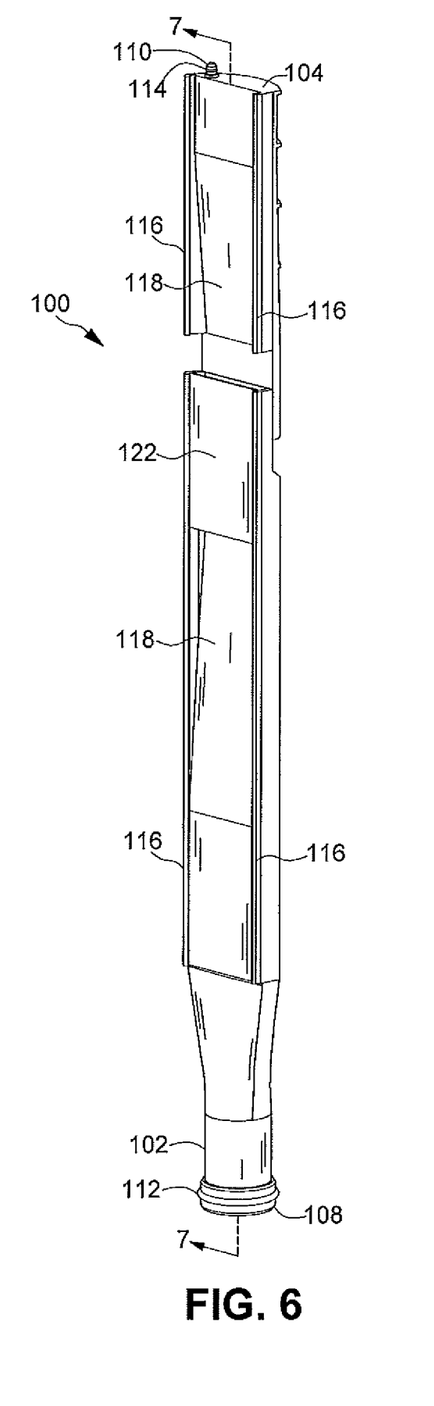
FIG. 6 is a front perspective view of a distribution insert according to another embodiment of the invention.
Figure 7:
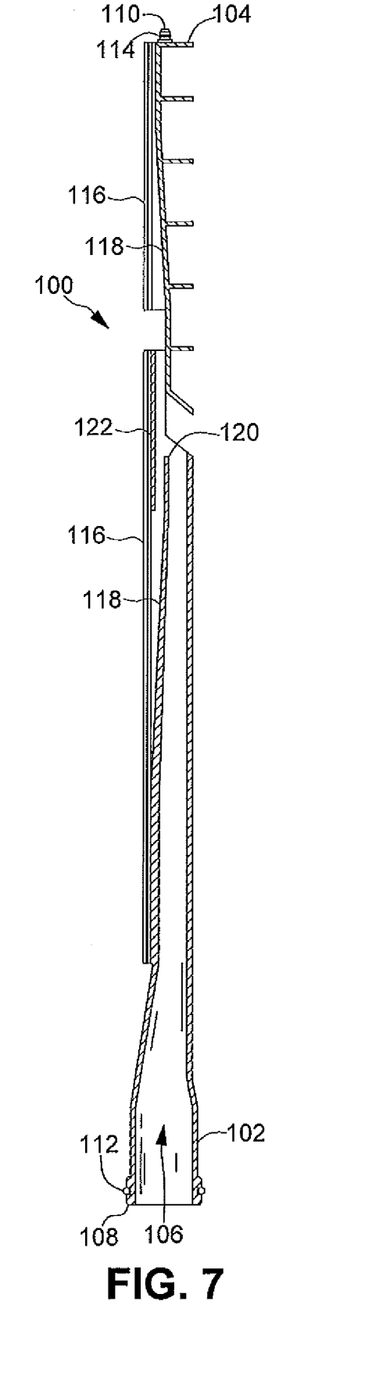
FIG. 7 is a cross-sectional side elevational view of the distribution insert illustrated in FIG. 6 and taken along line 7-7 of FIG. 6.

FIGS. 6-7 illustrate an alternate embodiment of a distribution insert for the fuel cell assembly 10. In the embodiment shown, a distribution insert 100 is a generally hollow elongate insert having a first end 102 and a second end 104. The distribution insert 100 is disposed within the inlet header 22 of the fuel cell assembly 10, wherein the first end 102 is disposed adjacent the inlet 26 of the end plate 14 and the second end 104 is disposed adjacent the end plate 16. The supply conduit 42 provides fluid communication from the source of the fuel to an inlet at the first end 102 of the distribution insert 100. The distribution insert 100 is adapted to provide a flow path 106 from the supply conduit 42 through the distribution insert 100 and into the inlet header 22 at about a mid-point along the length of the inlet header 22.

A first coupling member 108 is formed adjacent the first end 102 of the distribution insert 100 adapted to facilitate coupling the distribution insert 100 to the supply conduit 42. A first sealing member 112 such as an O-ring, for example, can be provided to facilitate forming a substantially fluid tight seal between the first coupling member 108 and the supply conduit 42. It should be understood that other first coupling members such as a threaded coupling, a snap-fit coupling, and the like, for example, can be provided to facilitate coupling the distribution insert 100 to the supply conduit 42. A second coupling member 110 is formed adjacent the second end 104 of the distribution insert 100 adapted to facilitate coupling the distribution insert 100 to the end plate 16. A second sealing member 114 such as an O-ring, for example, can be provided to facilitate forming a substantially fluid tight seal between the second coupling member 110 and the end plate 16. It should be understood that other second coupling members such as a threaded coupling, a snap-fit coupling, and the like, for example, can be provided to facilitate coupling the distribution insert 100 to the end plate 16.

Figure 8:
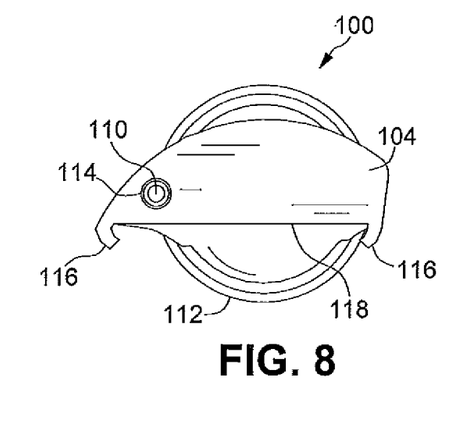
FIG. 8 is an enlarged end elevational view of the distribution insert illustrated in FIG. 6.

Walls 116 are formed on an outer surface of the distribution insert 100. The walls 116 extend parallel to a longitudinal axis of the distribution insert 100 and form a fluid flow channel 118 that extends from adjacent the first end 102 to the second end 104 of the distribution insert 100. An outlet 120 is formed in the distribution insert 100 to provide fluid communication between the flow path 106 and the fluid flow channel 118, wherein the outlet 120 is positioned at about the mid-point along the length of the flow channel 118. The fluid flow channel 118 is generally tapered, wherein a height of the walls 116 is at a maximum adjacent the outlet 120 and is at a minimum adjacent the ends of the fluid flow channel 118. The taper in the fluid flow channel 118 provides a general reduction in a cross-sectional area of the flow channel 118 moving in a direction from the outlet 120 toward the respective ends 102, 104 of the distribution insert 100. As shown in the illustrated embodiment, portions of the fluid flow channel 118 may not be tapered, such as the portions adjacent the outlet 120 and the portions adjacent the ends of the flow channel 118, for example. A baffle 122 is formed on the distribution insert 100 extending across the flow channel 118 adjacent an upper edge of the walls 116 and spaced from the outlet 120. A mid-point along the length of the baffle 122 is in substantial vertical alignment with a mid-point along the length of the outlet 120.

The distribution insert 100 may be formed as a single piece by injection molding a plastic material, for example. It should be understood that the distribution insert 100 may be formed as separate pieces which are coupled together employing an adhesive, a weld, and a snap-fit, for example. Additionally, the distribution insert 100 may be formed from a wicking material adapted to collect water entrained in the fuel. It should be understood that the wicking material can be a hydrophilic material, a hydrophobic material, and any other suitable material adapted to collect water entrained in the reactant.

It should be understood that the cross-sectional shape of the distribution insert 100 can be substantially circular, oval, triangular, square, rectangular, or a combination of curved and substantially planar surfaces, for example, wherein the cross-sectional shape of the distribution insert 100 is adapted to be received within the inlet header 22 of the fuel cell assembly 10.

In use, the distribution insert 100 is inserted within the inlet header 22 to cause the second coupling member 110 to engage the end plate 16. The first coupling member 108 is caused to sealingly engage the supply conduit 42 to provide a flow of fuel from a source through the supply conduit 42 and into the distribution insert 100. The first coupling member 108 and the second coupling member 110 facilitate securing the distribution insert 100 within the inlet header 22. An edge of the walls 116 abut the interior surface of the inlet header 22 to facilitate positioning a bottom surface of the flow channel 118 and the baffle 122 in spaced apart relation in respect of the interior surface of the inlet header 22. The distribution insert 100 is oriented in respect of the inlet header 22 to position the walls 116 and the flow channel 118 adjacent the inlet channels 23 of the fuel cells 12.

Fuel flows into and through the flow path 106 of the distribution insert 100. The fuel flows through the outlet 120 and is received within the flow channel 118. The baffle 122 causes a portion of the fuel to flow through the flow channel 118 toward the first end 102 of the distribution insert 100 and another portion of the fuel to flow through the flow channel 118 toward the second end 104 of the distribution insert 100. The fuel is received by the inlet channels 23 of the fuel cells 12 as the fuel flows through the flow channel 118 toward the respective ends 102, 104 of the distribution insert 100. As the fuel flows through the flow channel 118, a portion of the fuel flows around the ends of the baffle 122 and is received between the baffle 122 and the interior surface of the inlet header 22 adjacent the inlet channels 23 of the fuel cells 12 disposed in the center portion of the fuel cell assembly 10.

As the fuel flows through the flow channel 118 and fuel is received by the inlet channels 23 of the fuel cells 12, the volume of the fuel in the flow channel 118 is reduced. The reduced volume of fuel would normally cause an increase in a static fluid pressure and a reduction in a velocity of the fuel as the fuel flows toward the ends 102, 104 of the distribution insert 100. However, the reduction in the cross-sectional area of the fluid flow channel 118 moving away from the outlet 120 facilitates maintaining a selected fluid pressure and velocity of the fuel through the entire length of the flow channel 118 as the volume of the fuel is reduced due to the fuel flowing into the inlet channels 23 of the fuel cells 12. Further, introducing the fuel to the inlet header 22 adjacent the mid-point thereof and causing a portion of the fuel to flow around the baffle 122, minimize differences between lengths of the fluid flow path from the outlet 120 to the inlet channels 23 of the fuel cells 12.

By maintaining a selected fluid pressure and velocity of the fuel along the entire length of the flow channel 118 of the distribution insert 100, and by introducing the fuel into the inlet header 22 at about the mid-point thereof, a time difference between the introduction of the fuel to the fuel cells 12 is minimized. Further, by minimizing a time difference between the introduction of the fuel to the fuel cells 12, localized reversed current in the fuel cells 12 and an associated electrode carbon corrosion is minimized, and an undesired emission of hydrogen through the exhaust header is minimized.

FIGS. 8-15 illustrate an alternate embodiment of a distribution insert for the fuel cell assembly 10. In the embodiment shown, a distribution insert 200 is a generally hollow elongate insert having a first end 202 and a second end 204. The distribution insert 200 is disposed within the inlet header 22 of the fuel cell assembly 10. The first end 202 is disposed adjacent the inlet 26 of the end plate 14 and the second end 204 is disposed adjacent the end plate 16. The supply conduit 42 provides fluid communication from the source of the fuel to an inlet at the first end 202 of the distribution insert 200. The distribution insert 200 is adapted to provide a flow path 206 from the supply conduit 42 through an interior of the distribution insert 200 into the inlet header 22.

Figure 9:
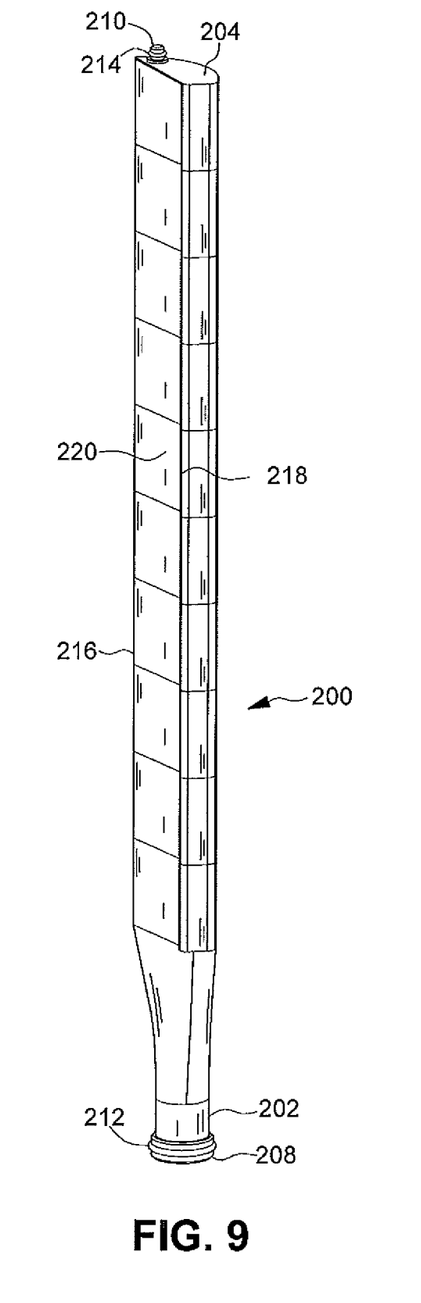
FIG. 9 is a front perspective view a distribution insert according to another embodiment of the invention.
Figure 10:
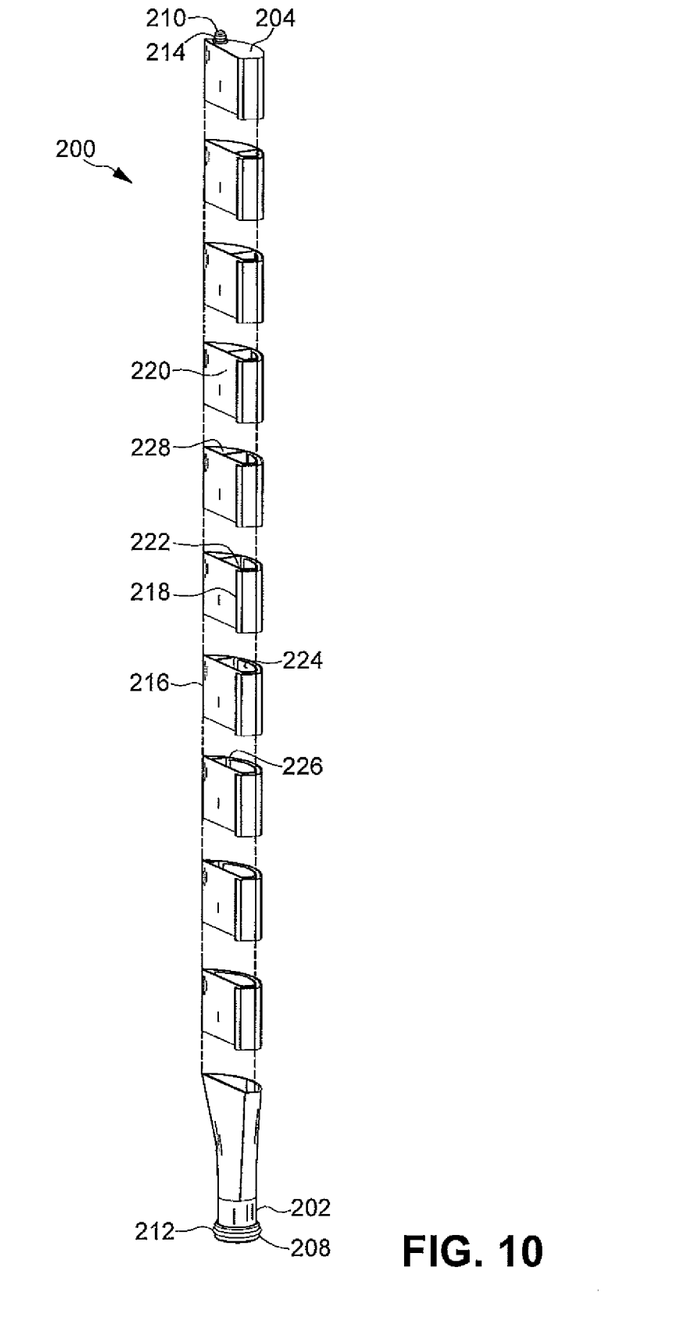
FIG. 10 is an exploded front perspective view of the distribution insert illustrated in FIG. 9.
Figure 11:
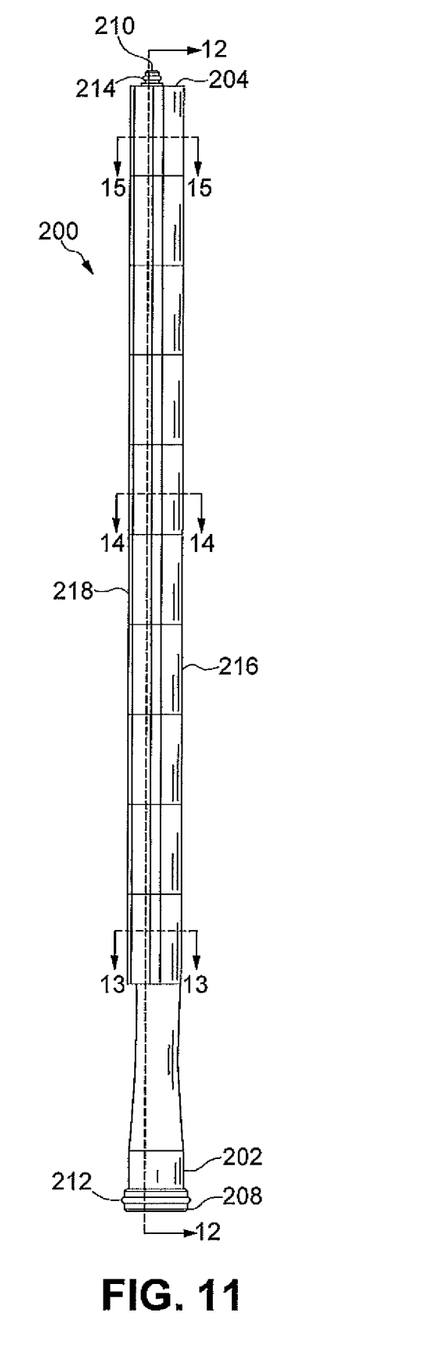
FIG. 11 is a side elevational view of the of the distribution insert illustrated in FIG. 9.

A first coupling member 208 is formed adjacent the first end 202 of the distribution insert 200 adapted to facilitate coupling the distribution insert 200 to the supply conduit 42. A first sealing member 212 such as an O-ring, for example, can be provided to facilitate forming a substantially fluid tight seal between the first coupling member 208 and the supply conduit 42. It should be understood that other first coupling members such as a threaded coupling, a snap-fit coupling, and the like, for example, can be provided to facilitate coupling the distribution insert 200 to the supply conduit 42. A second coupling member 210 is formed adjacent the second end 204 of the distribution insert 200 adapted to facilitate coupling the distribution insert 200 to the end plate 16. A second sealing member 214 such as an O-ring, for example, can be provided to facilitate forming a substantially fluid tight seal between the second coupling member 210 and the end plate 16. It should be understood that other second coupling members such as a threaded coupling, a snap-fit coupling, and the like, for example, can be provided to facilitate coupling the distribution insert 200 to the end plate 16.

The distribution insert 200 is divided into a plurality of distributor sections 216 along a longitudinal axis thereof. In the illustrated embodiment, the distribution insert 200 is divided into ten distributor sections 216. It should be understood that the distribution insert 200 may be divided into fewer or more distributor sections 216. A wall 218 extends outwardly from an edge of the distribution insert 200 substantially parallel to a longitudinal axis thereof to form a flow channel 220 on an outer surface of the distribution insert 200. The wall 218 is adapted to abut the interior surface of the inlet header 22 and maintain a gap between the interior surface of the inlet header 22 and a bottom surface of the flow channel 220. An outlet 222 is formed in each of the distributor sections 216 adjacent the wall 218. The outlet 222 provides fluid communication between the interior of the distribution insert 200 and the flow channel 220.

Each of the distributor sections 216 includes a wall member 224 extending outwardly from an inner surface of the distribution insert 200 to form a fluid passageway 226 providing fluid communication from the flow path 206 to the outlet 222. It should be understood that the wall member 224 can be formed provide a slope to a bottom surface of the fluid passageway 226, wherein the bottom surface of the fluid passageway 226 generally rises from the flow path 206 toward the opening 222. The slope in the bottom surface of the fluid passageway 226 facilitates drainage of a liquid water that may collect in the fluid passageway 226 into the flow path 206 by gravitational force and militates against a flow of the liquid water into the inlet header 22. Additionally, each of the distributor sections 216, except for the distributor section 216 adjacent the first end 202 of the distribution insert 200, includes a compartment 228. A volume of the compartment 228 increases in subsequent distributor sections 216 moving toward the second end 204 of the distribution insert 200. The compartment 228 reduces a volume of the flow path 206 and a length of the fluid passageway 226 in subsequent distributor sections 216.

The distribution insert 200 may be formed as a single piece by injection molding a plastic material, for example. It should be understood that the distributor sections 216 may be formed as separate pieces employing an injection molding process, for example, wherein the distributor sections 216 are coupled together to form the distribution insert 200. For example, each of the distributor sections 216 may be formed individually and then coupled together in substantially longitudinal alignment employing an adhesive, a weld, and a snap fit, for example. Additionally, the distribution insert 200 may be formed from a wicking material adapted to collect water entrained in the fuel. It should be understood that the wicking material can be a hydrophilic material, a hydrophobic material, and any other suitable material adapted to collect water entrained in the reactant.

Figure 12:
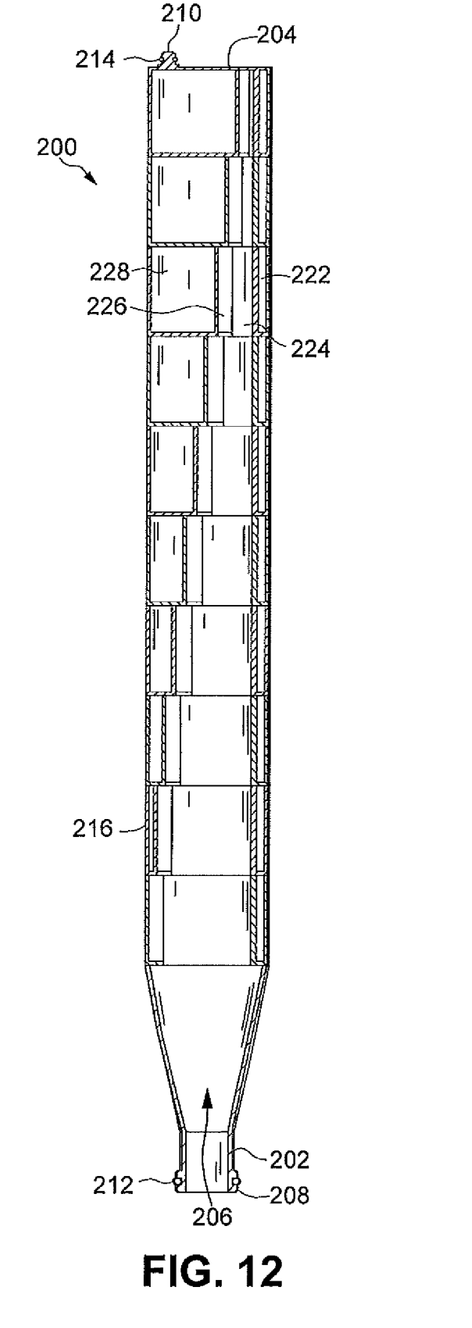
FIG. 12 is a cross-sectional front elevational view of the of the distribution insert illustrated in FIG. 9 taken along line 12-12 in FIG. 11.

It should be understood that the cross-sectional shape of the distribution insert 200 can be substantially circular, oval, triangular, square, rectangular, or a combination of curved and substantially planar surfaces, for example, wherein the cross-sectional shape of the distribution insert 200 is adapted to be received within the inlet header 22 of the fuel cell assembly 10.

In use, the distribution insert 200 is inserted within the inlet header 22 to cause the second coupling member 210 to engage the end plate 16. The first coupling member 208 is caused to sealingly engage the supply conduit 42 to provide a flow of fuel from a source through the supply conduit 42 and into the inlet of the distribution insert 200. The first coupling member 208 and the second coupling member 210 facilitate securing the distribution insert 200 within the inlet header 22. An edge of the wall 218 abuts the interior surface of the inlet header 22 to facilitate positioning a bottom surface of the flow channel 220 in spaced apart relation in respect of the interior surface of the inlet header 22. The distribution insert 200 is oriented in respect of the inlet header 22 to position the flow channel 220 adjacent the inlet channels 23 of the fuel cells 12.

Figure 13:
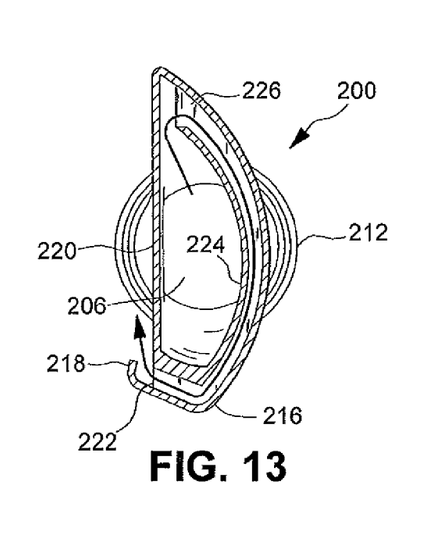
FIG. 13 is a cross-sectional plan view of the distribution insert illustrated in FIG. 9 taken along line 13-13 in FIG. 11.
Figure 14:
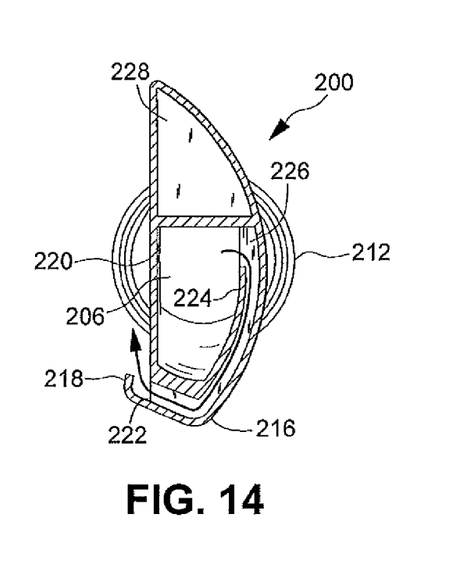
FIG. 14 is a cross-sectional plan view of the distribution insert illustrated in FIG. 9 taken along line 14-14 in FIG. 11.
Figure 15:
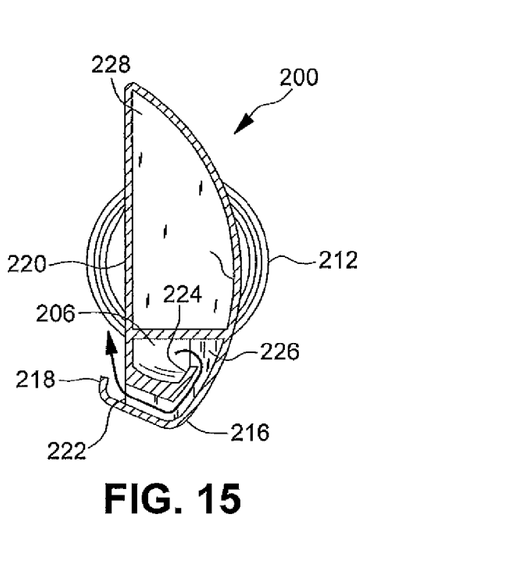
FIG. 15 is a cross-sectional plan view of the distribution insert illustrated in FIG. 9 taken along line 15-15 in FIG. 11.

Fuel flows through the flow path 206 to each of the distributor sections 216 of the distribution insert 200. A portion of the fuel flowing through the flow path 206 flows through the fluid passageway 226 and the outlet 222 of each of the distributor sections 216 and is received within the flow channel 220, wherein the fuel is received by the inlet channels 23 of the fuel cells 12 adjacent the respective distributor sections 216.

As the fuel flows through the flow path 206 toward the second end 204 of the distribution insert 200 and a portion of the fuel is directed by the distributor sections 216 to the inlet channels 23 of the fuel cells 12, the volume of the fuel in the flow path 206 is reduced. The reduced volume of fuel would normally cause an increase in a static fluid pressure and a reduction in a velocity of the fuel as the fuel flows toward the second end 204 of the distribution insert 200. However, beginning with the second distributor section 216 from the first end 202, the compartments 228 reduce a volume of the flow path 206 in each successive distributor section 216. The reduced volume of the fluid flow path 206 in successive distributor section 216 facilitates maintaining a selected fluid pressure and velocity of the fuel through the entire length of the flow path 206 as the volume of the fuel is reduced due to the fuel flowing into the inlet channels 23 of the fuel cells 12. Further, a length of the fluid passageway 226 is reduced in each successive distributor section 216 to minimize differences between lengths of the fluid flow paths from the supply conduit to the outlet 222 in each of the distributor sections 216.

By maintaining a selected fluid pressure and velocity of the fuel along the entire length of the flow path 206 of the distribution insert 200, and by minimizing the differences between lengths of the fluid flow paths from the supply conduit 42 to the outlet 222 in each of the distributor sections 216, a time difference between the introduction of the fuel to the fuel cells 12 is minimized. Further, by minimizing a time difference between the introduction of the fuel to the fuel cells 12, localized reversed current in the fuel cells 12 and an associated electrode carbon corrosion is minimized, and an undesired emission of hydrogen through the exhaust header is minimized.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fluid distribution insert for a fuel cell assembly comprising:
   a hollow inner tube at least partially surrounded by an outer tube, the hollow inner tube including a first end, a second end, and an inlet configured to receive a fluid therein;
   at least one wall section, in cooperation with a lip, extending outwardly from an outer surface of the hollow inner tube to form a flow channel thereon; and
   at least one outlet formed in the hollow inner tube within the flow channel, the at least one outlet configured to provide fluid communication between an interior of the hollow inner tube and the flow channel, wherein the flow channel delivers the fluid to a plurality of fuel cells of the fuel cell assembly at a substantially constant pressure, and wherein the fluid distribution insert is configured to be received within an inlet header of the fuel cell assembly.

2. The fluid distribution insert according to claim 1, wherein the hollow inner tube includes a plurality of sections along a length thereof, each of the sections including a flow path therethrough, and wherein a plurality of the outlets is formed in the hollow inner tube, each of the sections including one of the outlets.

3. The fluid distribution insert according to claim 2, further comprising a compartment formed in the interior of the hollow inner tube in at least one of the sections, wherein the compartment reduces a volume of the flow path through the at least one of the plurality of sections.

4. The fluid distribution insert according to claim 2, further comprising a fluid passageway formed in the interior of the hollow inner tube in each of the sections, the fluid passageway providing fluid communication between the flow path through the sections and the outlet, wherein a length of the fluid passageway is shortened in each successive section moving away from the first end of the hollow inner tube.

5. The fluid distribution insert according to claim 1, wherein the outer tube includes a plurality of apertures formed therein, and wherein the at least one wall section of the hollow inner tube abuts an inner surface of the outer tube to maintain the inner surface of the outer tube spaced apart from the outer surface of the hollow inner tube.

6. A fuel cell assembly comprising:
   a first end plate and a spaced apart second end plate;
   a plurality of fuel cells disposed between the first end plate and the second end plate;
   an inlet header in fluid communication with the fuel cells for supplying a reactant gas to the fuel cells; and
   a fluid distribution insert configured to be received within the inlet header of the fuel cell assembly, the fluid distribution insert including a hollow inner tube and an outer tube surrounding at least a portion of the hollow inner tube, wherein the hollow inner tube includes a first end, a second end, an inlet configured to receive the reactant gas therein, at least one wall section, in cooperation with a lip, extending outwardly from an outer surface of the hollow inner tube to form a flow channel thereon, and at least one outlet formed within the flow channel configured to provide fluid communication between an interior of the hollow inner tube and the flow channel, and wherein the flow channel delivers the reactant gas to the inlet header of the fuel cell assembly at a substantially constant pressure along a length thereof.

7. The fuel cell assembly according to claim 6, wherein the hollow inner tube includes a plurality of sections along a length thereof, each of the sections including a flow path therethrough, and wherein a plurality of the outlets is formed in the hollow inner tube, each of the sections including one of the outlets.

8. The fuel cell assembly according to claim 7, further comprising a compartment formed in the interior of the hollow inner tube in at least one of the sections, wherein the compartment reduces a volume of the flow path through the at least one of the plurality of sections.

9. The fuel cell assembly according to claim 7, further comprising a fluid passageway formed in the interior of the hollow inner tube in each of the sections, the fluid passageway providing fluid communication between the flow path through the at least one of the sections and the outlet, wherein a length of the fluid passageway is shortened in each successive section moving away from the first end of the hollow inner tube.

10. The fuel cell assembly according to claim 6, wherein the outer tube includes a plurality of apertures formed therein, and wherein the at least one wall section of the hollow inner tube abuts an inner surface of the outer tube to maintain the inner surface of the outer tube spaced apart from the outer surface of the hollow inner tube.

11. A fluid distribution insert for a fuel cell assembly comprising:

a hollow inner tube with a first end, a second end, and an inlet formed at the first end configured to receive a fluid therein;

at least one lip and wall element extending outwardly from an outer surface of the hollow inner tube;

an outer tube surrounding at least a portion of the hollow inner tube, the outer tube including a plurality of apertures formed therein, wherein the at least one lip and wall element of the hollow inner tube abuts an inner surface of the outer tube to maintain the inner surface of the outer tube spaced apart from the outer surface of the hollow inner tube, thereby forming at least one flow channel defined at least in part by the outer surface of the hollow inner tube, the inner surface of the outer tube, and the at least one lip and wall element; and at least one outlet formed in the hollow inner tube, the outlet configured to provide fluid communication between an interior of the hollow inner tube and the at least one flow channel, wherein the at least one flow channel delivers the fluid to a plurality of fuel cells of the fuel cell assembly at a substantially constant pressure, wherein the fluid distribution insert is configured to be received within an inlet header of the fuel cell assembly.

12. The fluid distribution insert according to claim 11, wherein the hollow inner tube includes a plurality of sections along a length thereof, each of the sections including a flow path therethrough, and wherein a plurality of the outlets is formed in the hollow inner tube, each of the sections including one of the outlets.

13. The fluid distribution insert according to claim 12, further comprising a compartment formed in the interior of the hollow inner tube in at least one of the sections, wherein the compartment reduces a volume of the flow path through the at least one of the plurality of sections.

14. The fluid distribution insert according to claim 12, further comprising a fluid passageway formed in the interior of the hollow inner tube in each of the sections, the fluid passageway providing fluid communication between the flow path through the sections and the outlet, wherein a length of the fluid passageway is shortened in each successive section moving away from the first end of the hollow inner tube.

* * * * *